Figure 1:
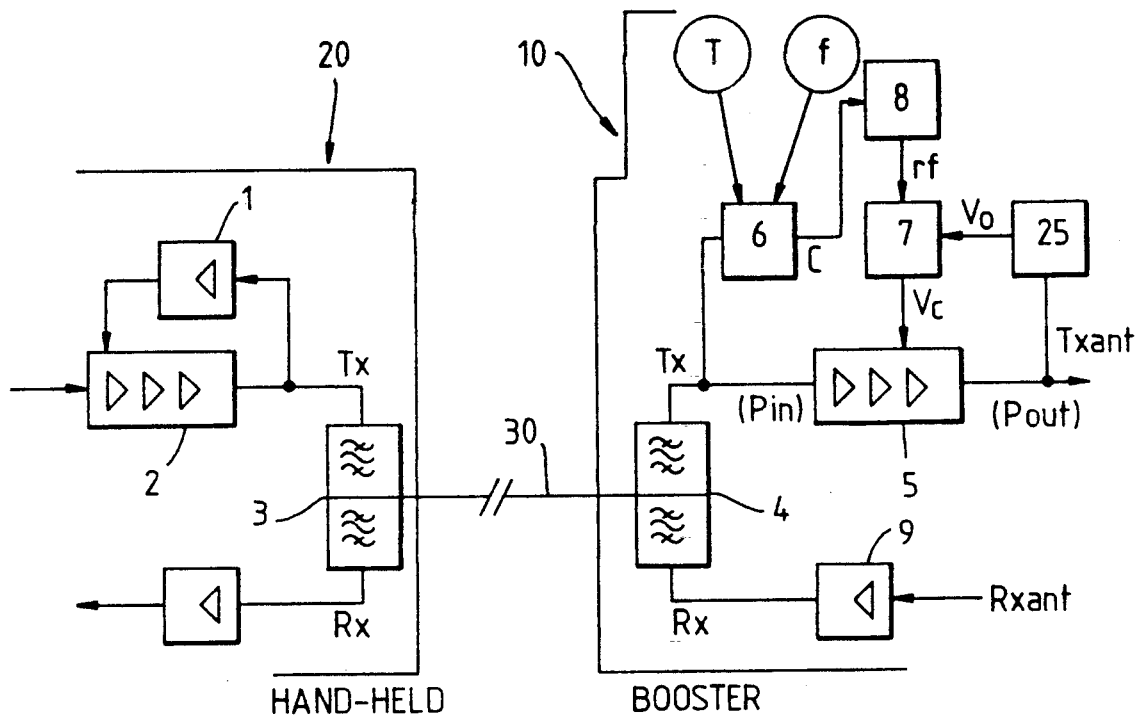

United States Patent [19]

Muurinen

[11] Patent Number: 5,291,147
[45] Date of Patent: Mar. 1, 1994

[54] POWER BOOSTER FOR A RADIO TELEPHONE

[75] Inventor: Jari Muurinen, Pernio, Finland

[73] Assignee: Nokia Mobile Phones, Ltd., Finland

[21] Appl. No.: 946,926

[22] Filed: Sep. 17, 1992

[30] Foreign Application Priority Data

Sep. 24, 1991 [FI] Finland ................................. 914484

[51] Int. Cl.$^5$ ................................................. H03G 3/20
[52] U.S. Cl. ..................................... 330/136; 330/279;
455/116; 455/126
[58] Field of Search ....................... 330/129, 136, 279;
455/116, 126, 127

[56] References Cited

U.S. PATENT DOCUMENTS 5,101,173  3/1992  DiPiazza et al. ................ 330/279 X
5,193,223  3/1993  Walczak et al. ................. 455/116 X

FOREIGN PATENT DOCUMENTS 413355   2/1991  European Pat. Off. ............ 455/127
914484   5/1992  Finland .
2241124  8/1992  United Kingdom ........... H03G 3/20

OTHER PUBLICATIONS

"An Integrated Chipset For Cellular Mobile Telephones", by Trevor Hall & Peter Hall from Electronic Components and Applications, vol. 10, No. 1, pp. 31-36.

Primary Examiner—James B. Mullins
Attorney, Agent, or Firm—Perman & Green

[57] ABSTRACT

A power booster (10) comprises a power amplifier (5) and is coupled to a portable radio telephone (20) which transmits an RF signal at one of a predetermined set of power levels. A first detector (6) generates an output signal C indicative of the power of the RF signal received by the booster. The signal C is used to generate a reference signal rf from a look up table (8) in which is stored a set of values corresponding with the respective power levels. The reference signal rf, which indicates the required power level, is applied to a power control circuit (7) which controls the gain of the amplifier (5) to maintain the power output substantially constant at the required power level as determined by the value of the reference signal rf.

5 Claims, 2 Drawing Sheets

POWER BOOSTER FOR A RADIO TELEPHONE

This invention relates to a power booster for a portable radiotelephone, particularly but not exclusively a cellular telephone, operable to transmit a radio frequency (RF) signal at one of a predetermined set of power levels.

The radiation power of the antenna in a radiotelephone, particularly a portable telephone, may be increased using a power amplifier, i.e. a so-called "power booster" before the antenna. In conventional solutions the amplifier output is linear, so that it will follow the power of the RF input signal and amplify it by a constant factor. In a separate circuit or circuits the portable radiotelephone generally outputs, in addition to the RF transmission signal, a control signal proportional to the required power, which determines the power level output of the power amplifier.

The transmission power of a portable radiotelephone can vary for different reasons, e.g. due to temperature variations, or changes in the selected transmission frequency or in the battery voltage. Such variations have to be substantially eliminated so that they do not impair the quality of the radio communication.

In the US AMPS system and the British TACS system, eight standard power levels (0,1, ... 7) are defined. The lowest power level 7 is mominally 6 mW and adjacent power levels are spaced apart by 4 dB. Each level has a tolerance level of +2 dB/−4 dB so that if the actual output power is within this tolerance range, the system treats this as if the transmission was at the requested level. There is a need to maintain the output power substantially constant at the required power level.

As previously mentioned, the portable radio telephone sends to the booster a signal indicating the required power level. There are several known methods to generate a control signal indicative of the power level. For example, the additional power may be indicated on an auxiliary control line; or the power level could be indicated on a control line, which transmits a "1" on alternate levels and a "0" on the other levels.

Power control using separate control lines has attendant disadvantages since the cables and connectors tend to introduce interference and spurious radiation. Moreover, separate control lines require additional space which is usually at a premium in compact portable equipment. They also increase the risk of malfunction and increase costs.

European patent application EP-A-0,359,477 discloses a technique for linearising the gain of the RF amplifier in a radiotelephone, so that the power output is directly controlled by the transmission power of the mobile phone, utilizing the antenna cable. However, this earlier patent application is not concerned with power levels at predetermined levels, but the power amplifier operates with a constant gain, whereby the output power varies linearly as a function of the input power.

European patent application EP-A-0,413,355 discloses a vehicular power booster for a portable radiotelephone, in which the portable radiotelephone is operable to transmit a radio frequency (RF) signal at one of a predetermined set of power levels. A cable is provided for coupling the booster to the portable radiotelephone to receive the RF signal. A first detector measures the power of the RF signal received from the portable radiotelephone and generates a first signal indicative thereof. A reference voltage source is provided for generating a set of reference voltages respectively representing the predetermined power levels. A decision circuit is included for identifying one of the reference voltages depending on said first signal. A variable gain controlled power amplifier stage amplifies the received RF signal and applies it to a vehicle antenna. A second power detector determines the power of the amplified RF signal output by the amplifying means and generates a second signal indicative thereof. A gain control driver is responsive to the difference between the second signal and the reference signal for controlling the gain of the amplifier to maintain the power output thereof substantially constant at the required power level.

According to the present invention there is provided a power booster for a portable radiotelephone, the portable radiotelephone being operable to transmit a radio frequency (RF) signal at one of a predetermined set of power levels, the booster including means for coupling the booster to the portable radiotelephone to receive the RF signal transmitted thereby, first detector means for detecting the power of the RF signal received from the portable radiotelephone and for generating a first signal indicative thereof, means responsive to said first signal for generating reference signals indicative of the respective power levels, gain controlled power amplifying means for amplifying the received RF signal, second detector means for detecting the power of the amplified RF signal output by the amplifying means and for generating a second signal indicative thereof, gain control means responsive to the difference between the second signal and the reference signal for controlling the gain of the amplifying means to maintain the power output thereof substantially constant at the required power level, characterized in that the reference signal generating means comprises memory means for storing a set of values corresponding to the respective reference signals, and means for selecting a value from said memory means depending on the first signal.

Suitably, the memory means and the selecting means are in the form of a look up table.

Means may also be included for modifying the first signal depending on (a) the temperature in the vicinity of the amplifying means, or (b) the frequency of the received RF signal.

In one embodiment means may be provided for disabling the amplifying means responsive to a predetermined value of the first signal, specifically when the first signal is substantially zero.

Means may also be provided for enabling (including re-enabling) the amplifying means responsive to the first signal exceeding a predetermined threshold value.

The present invention thus permits power level adjustment in an RF power booster for a radiotelephone, e.g. a mobile telephone, and provides automatic level control, i.e. maintains the output power substantially constant at the power level in question, while obviating the need for one or more separate control lines. The reference signals are derived very simply from values stored in a memory such as an EEPROM, these values being determined and stored in advance.

Figure 2:
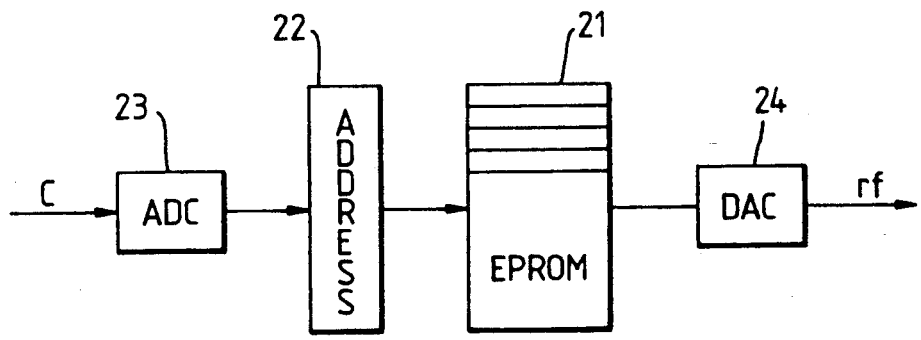
Figure 3:
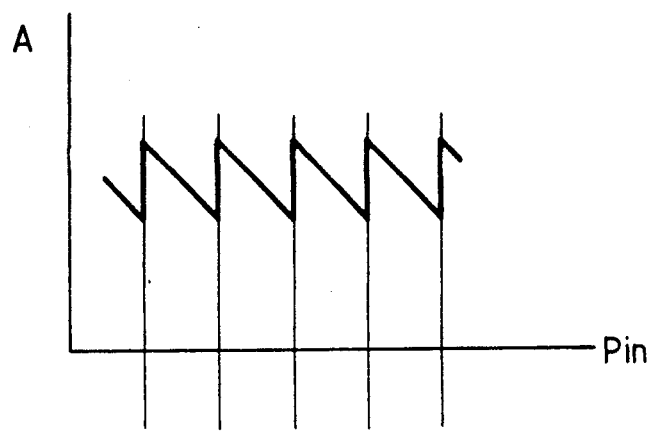
Figure 4:
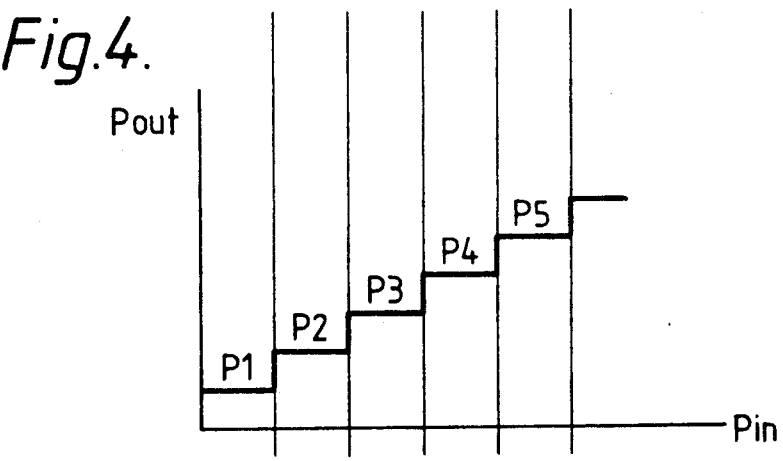

An embodiment of the invention will now be described, by way of example, with reference to the accompanying drawings, in which:

FIG. 1 is a block diagram of a booster coupled to a portable radio telephone in accordance with the invention, FIG. 2 is a block diagram showing in more detail part of the booster in FIG. 1, FIG. 3 is a graph showing the variation of the gain with the input power in the booster, and FIG. 4 is a graph showing the variation of the output power with the input power in the booster.

With reference to FIG. 1, the radio frequency power booster 10 is coupled between the portable radiotelephone 20 and an antenna (not shown), whereby the output power signal Txant from the power amplifier 5 is supplied to the antenna via a duplex filter (not shown) in front of the antenna. Correspondingly, the radio signal Rxant received by the antenna is supplied via the duplex filter to a receiver amplifier 9.

The receive and transmit branches of the booster 10 are coupled to a duplex filter 4 which, in turn is coupled to an (external) antenna cable 30. The other end of the cable 30 is coupled to the portable radiotelephone 20, designated "Hand-held" in FIG. 1a. As is well-known, the portable radiotelephone 20 comprises a duplex filter 3, to which the receiving branch Rx and the transmission branch Tx of the radiotelephone are connected. As is conventional, the transmission branch includes a transmitter 2 and an automatic power control circuit 1. Other parts of the hand-held phone are not shown in the figure, since they are not relevant to the present invention.

In the booster transmission branch Tx the output power of the power amplifier 5 is regulated by an automatic power control circuit 7 which controls the gain of the power amplifier 5. For this purpose a power detector 25, e.g. a directional coupler and associated circuitry is coupled to the output of the power amplifier 5. The detector 25 generates a signal Vo indicative of the output power, and the signal Vo is applied to the power control circuit 7 which compares the value of Vo to a reference signal rf applied to the control circuit. The control circuit 7 generates a control signal Vc depending on the difference (Vo−rf) between the signal Vo and the reference signal rf. The control signal Vc is applied to the power amplifier 5 to modify the gain thereof and so maintain a substantially constant output power at the power level concerned.

A further power detector 6 is also coupled on the input side of the power amplifier 5. In the present embodiment the detector is coupled on the output side of the duplex filter 4, but in an alternative arrangement the input power detector may be coupled to detect the input power before the duplex filter 4. The detector 6 generates a signal c indicative of the input power of the transmission signal received from the portable radiotelephone. The signal C is applied to a look up table arrangement 8, as shown in more detail in FIG. 2, which generates a reference signal rf dependant on the magnitude of the signal C. For example the look up table arrangement 8 comprises a memory such as an EEPROM 21 in which are pre-stored at addressable locations a set of values corresponding to the reference signal values indicative of the respective power levels. There is a separate value for each power level (eight in TACS and AMPS). As shown in FIG. 2, the address of the particular value to be retrieved from the memory 21 is generated at address block 22. Since the signal C is an analogue signal in the present embodiment, an analaogue-digital converter (ADC) 23 is utilised to convert C into the digital address format. A digital-analogue converter (DAC) 24 is used to convert the digital value retrieved from the memory 21 to the analogue reference signal rf which is applied to the power level control circuit 7. It will be evident to the person skilled in the art that the look up table arrangement 8 may be implemented in a microprocessor (not shown).

Thus when the input power to the booster 10 from the portable radiotelephone 20 varies, this will be detected by the detector 6. The signal C output by the detector 6 will vary accordingly and consequently the value of the address generated at block 22 will be modified thereby causing a value stored in a different location in the memory 21 to be retrieved. Accordingly the reference signal rf issuing from the DAC 24 will be adjusted according to the required power level. Hence the gain control of the power amplifier 5 is adjusted to achieve the correct power level, and the power level output is then maintained substantially constant by the automatic level control circuit 7.

FIG. 1 also shows in principle how information about temperature from sensor means T and information about the operating frequency f can be supplied as additional parameters to the input power level detector 6. The parameters T and f are used to modify the signal C output by the detector 6 and consequently to alter the gain of the power amplifier 5, thus compensating for variations in the power level caused by changes in temperature and operating frequency. It is noted that these compensating parameters may be applied at other placesin the circuit of FIG. 1.

In FIG. 3 it can be seen how the gain A of the power amplifier 5 varies within each power level band, as a function of the input power Pin and controlled by the automatic level control circuit 7. In FIG. 4 it is seen how the output power Pout remains constant at a particular power level (P1 . . .), even if the input power varies within a certain power "window".

As explained above, the input power Pin to the power amplifier is monitored by the detector 6. If the signal C from the detector 6 exceeds a defined threshold, e.g. a lower limit corresponding to power level P1, and when supply voltages (not shown) are switched on to the amplifier 5, then the bias voltages are connected to the amplifier and the transmission begins. Correspondingly the power control circuit may cause the supply voltage to be switched off, if the input power Pin measured by the detector 6 (and represented by signal C) becomes zero.

In view of the foregoing description, it will be evident to a person skilled in the art that various modifications may be made within the scope of the present invention.

I claim:

1. A power booster for a portable radiotelephone, the portable radiotelephone being operable to transmit a radio frequency (RF) signal at one of a predetermined set of power levels, the booster including:

means for coupling the booster to the portable radiotelephone to receive the RF signal transmitted thereby, first detector means for detecting the power of the RF signal received from the portable radiotelephone and for generating a first signal indicative thereof, means responsive to said first signal for generating reference signals indicative of the respective power levels, gain controlled power amplifying means for amplifying the received RF signal, second detector means for detecting the power of the amplified RF signal output by the amplifying means and for generating a second signal indicative thereof, gain control means responsive to the difference between the second signal and the reference signal for controlling the gain of the amplifying means to maintain the power output thereof substantially constant at the required power level, means for disabling the amplifying means responsive to a predetermined value of the first signal, means for enabling the amplifying means responsive to the first signal exceeding a predetermined threshold value.

characterized in that the reference signal generating means comprises memory means for storing a set of values corresponding to the respective reference signals, and means for selecting a value from said memory means depending on the first signal.

2. A power booster as claimed in claim 1, wherein the memory means and the selecting means are in the form of a look up table.

3. A power booster as claimed in claim 1, including means for modifying the first signal depending on the temperature in the vicinity of the amplifying means.

4. A power booster as claimed in claim 1, including means for modifying the first signal depending on the frequency of the received RF signal.

5. A power booster as claimed in claim 1, wherein the predetermined value of the first signal is substantially zero.

* * * * *